United States Patent [19]

Esterowitz et al.

[11] Patent Number: 5,487,079
[45] Date of Patent: Jan. 23, 1996

[54] CONTINUOUSLY TUNABLE UV CE:LISAF SOLID STATE LASER

[75] Inventors: Leon Esterowitz, Springfield, Va.; Joseph F. Pinto, Laurel, Md.

[73] Assignee: The United States of America as represented by the Secretary of the Navy, Washington, D.C.

[21] Appl. No.: 368,821

[22] Filed: Jan. 5, 1995

[51] Int. Cl.$^6$ ........................................ H01S 3/10
[52] U.S. Cl. .................. 372/20; 372/41; 372/42; 372/22; 372/23; 372/69; 372/105; 372/102; 372/100

[58] Field of Search ................... 372/20, 39, 42, 372/69, 22, 23, 102, 100, 105

*Primary Examiner*—Leon Scott, Jr.
*Attorney, Agent, or Firm*—Thomas E. McDonnell; John J. Karasek

[57] ABSTRACT

An ultraviolet solid state laser includes: (a) a laser cavity defined by a set of opposing mirrors, (b) a laser medium disposed in this laser cavity, where this medium includes a LiSrAlF$_6$ (LiSAF) host material doped with enough cerium ions to produce a longitudinal mode laser emission when this laser medium is pumped; and (c) a source of pumping radiation.

21 Claims, 4 Drawing Sheets

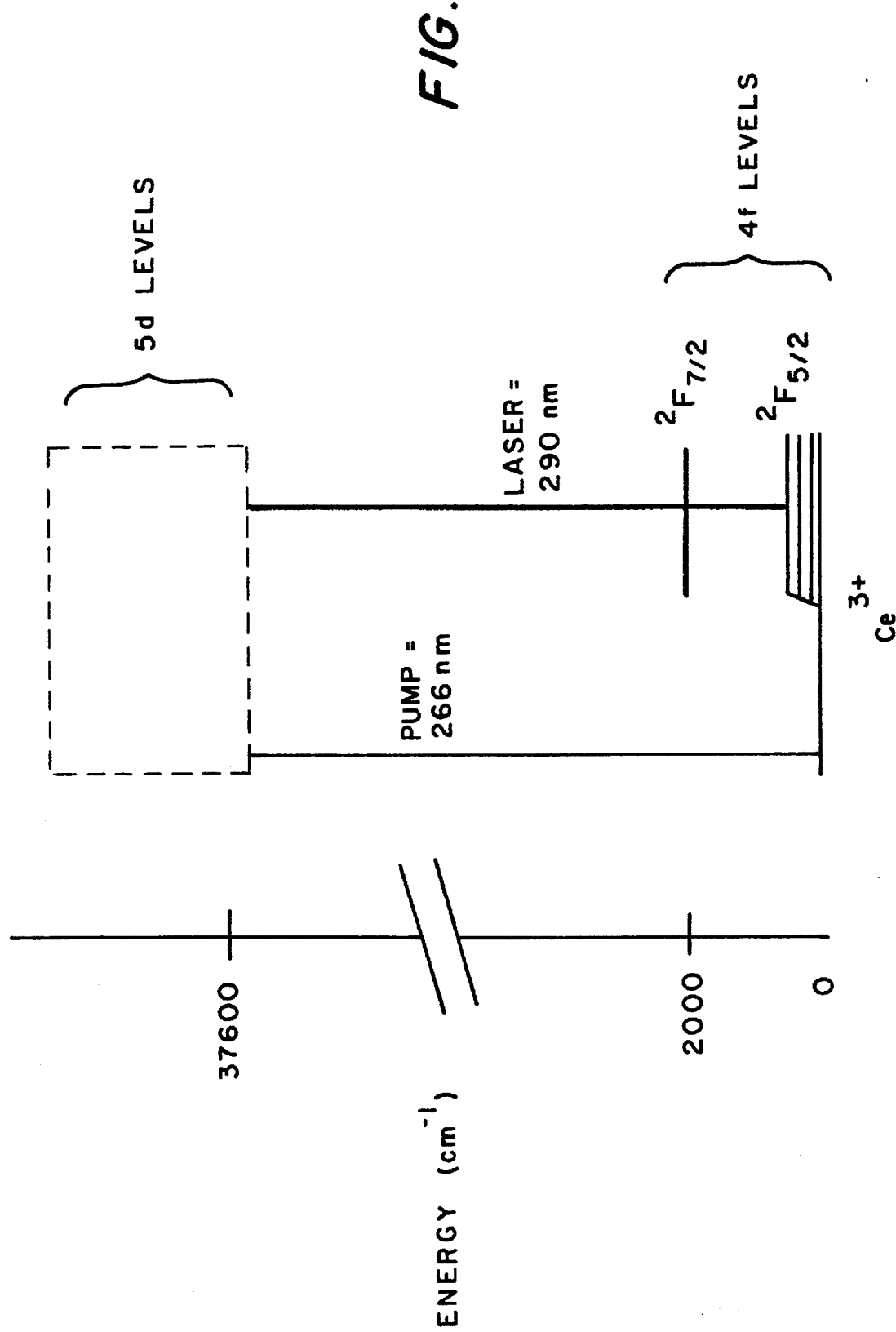

CONTINUOUSLY TUNABLE UV CE:LISAF SOLID STATE LASER

BACKGROUND OF THE INVENTION

1. Field of the Invention

This invention relates to tunable solid state ultraviolet lasers, and more particularly to Ce:LiSAF solid state lasers.

2. Description of the Related Art

Continuously tunable near ultraviolet solid state lasers are desired for a number of applications, including remote sensing, and as seed sources for excimer lasers. In particular, a laser that can tune out to 308 nm and beyond is desired as a seed source for XeCl.

Solid-state lasers based on cerium-doped fluoride hosts provide a source of tunable, coherent radiation in the near ultraviolet. These fluoride hosts include $YLiF_4$, $LaF_3$, $CaF_2$, and $BaY_2F_8$. The utility of near UV cerium-doped lasers using these hosts has been limited, however, by a combination of excited state absorption, transient color center absorption, and the requirement of a high power excimer laser pump source.

In contrast to these hosts, $Ce^{3+}$-doped colquiriite crystals have absorption bands which overlap the fourth harmonic output of $Nd^{3+}$-based lasers. Accordingly, these crystals may be suitable for the same applications as the $Nd^{3+}$-based lasers.

Tunable $Ce^{3+}:LiCaAlF_6$ (Ce:LiCAF) lasers have been demonstrated using a frequency-quadrupled, Q-switched Nd:YAG pump laser operating at 266 nm. However, this laser suffers from several shortcomings. The Ce:LiCAF laser has a low output power, and a low (about 8.7%) slope efficiency. Further, its tunability range has been extended only up to about 297 nm. Since the fluorescence spectrum of Ce:LiCAF does not have significant intensity at longer wavelengths, it is anticipated that the tunability of the Ce:LiCAF laser has been extended about as far as is practicable. In particular, Ce:LiCAF lasers will not be suitable for use as seed sources for XeCl.

SUMMARY OF THE INVENTION

Accordingly, it is an object of this invention to provide a solid state cerium-doped laser that has the advantages of the Ce:LiCAF laser, while avoiding the disadvantages of this laser medium.

It is a further object of this invention provide a solid state cerium-doped laser having a power output about an order of magnitude larger than that of the Ce:LiCAF laser, having a higher slope efficiency than that of the Ce:LiCAF laser, and having a tunability range that extends well beyond that of the Ce:LiCAF laser.

These and additional objects of the invention are accomplished by the structures and processes hereinafter described.

The present invention is an ultraviolet solid state laser, including: (a) a laser cavity defined by a set of opposing mirrors, (b) a laser medium disposed in this laser cavity, where this medium includes a $LiSrAlF_6$ (LiSAF) host material doped with enough cerium ions to produce a longitudinal mode laser emission when this laser medium is pumped; and (c) a source of pumping radiation.

BRIEF DESCRIPTION OF THE DRAWINGS

A more complete appreciation of the invention will be readily obtained by reference to the following Description of the Preferred Embodiments and the accompanying drawings in which like numerals in different figures represent the same structures or elements, wherein:

FIG. 3 shows the pumping scheme for Ce:LiSAF.

DESCRIPTION OF THE PREFERRED EMBODIMENTS

J. F. Pinto et al. "Tunable solid-state laser action in $Ce^{3+}:LiSrAlF_6$", Electronics Letters 30 (3) (Feb. 3, 1994) is incorporated by reference herein.

Figure 1:
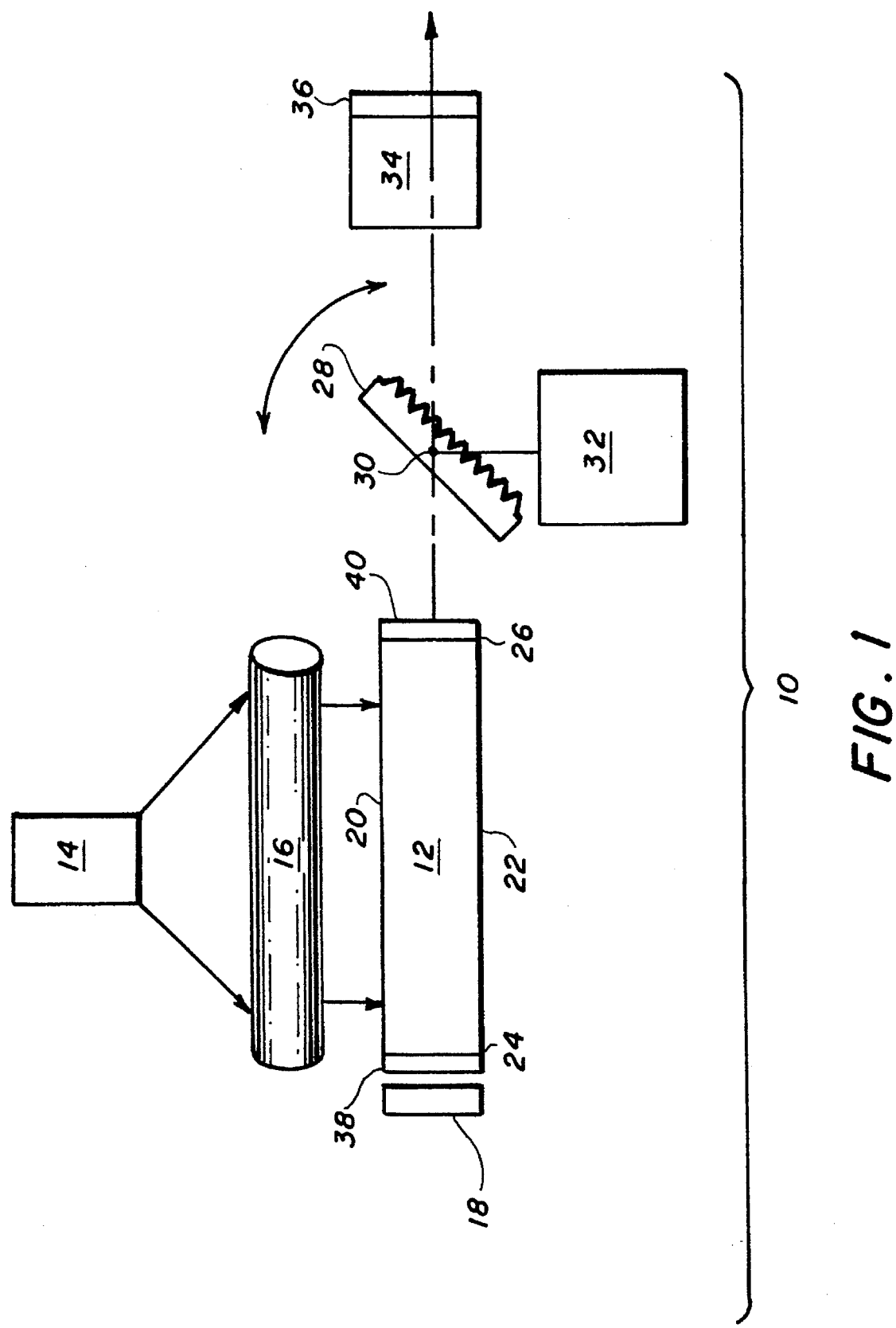
FIG. 1 is a representational diagram of the laser of the invention.

Referring to FIG. 1, the instant laser 10 includes a Ce:LiSAF crystal 12 disposed in a cavity defined by a first 18 and a second 36 opposing mirrors. A pump 14 provides pumping radiation, and is typically coupled to the crystal 12 through coupling optics 16. The laser 10 may optionally include a tuning element 28. It may also optionally include a frequency doubler 34.

Figure 2:
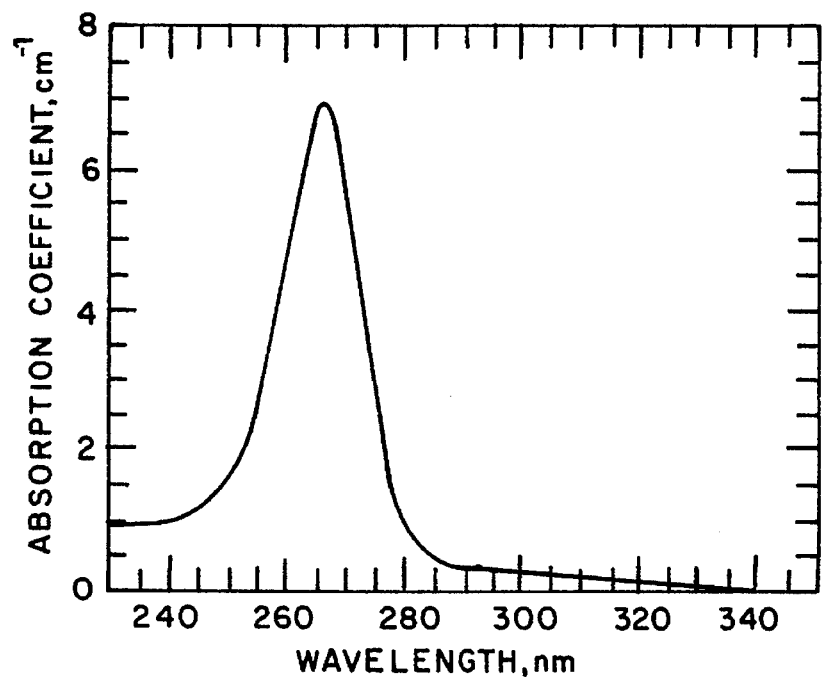
FIG. 2 shows the absorption band of a Ce:LiSAF crystal.

The pump 14 is preferably a laser operating in the absorption band of Ce:LiSAF (shown in FIG. 2). More preferably, the pump 14 operates between about 260 and about 275 nm. Exemplary pump lasers include solid state lasers emitting in the fourth harmonic of neodymium, including Nd:YAG, Nd:YAlO, and Nd:YILF.

This pumping radiation stimulates the emission of radiation from the Ce:LiSAF crystal, as shown in FIG. 3.

Referring back to FIG. 1, the pump 14 preferably directs pumping radiation into one side 20 of the crystal 12. Side-pumping provides the ability to distribute pumping energy along the length of the crystal 12, thus minimizing fluence. Since higher fluences are associated with greater potential for optical damage to the crystal surface, it is preferred to distribute the input of the pumping energy as much as possible. In this side-pumping embodiment, a cylindrical lens 16 typically serves as the coupling optics, to direct the pumping radiation into the crystal 12.

Alternatively to side-pumping, the crystal 12 is end-pumped.

Preferably, the crystal 12 is configured to prevent oscillation between any of the faces of the crystal 12, except along the axis perpendicular to the mirrors 18,36 that define the laser cavity. In particular, in a side-pumping configuration, it is preferred to prevent oscillation between the side 20 of the crystal 12 where the pumping radiation is introduced and the opposing side 22 of the crystal 12. Typically, this is accomplished by making these two sides 20,22 sufficiently nonparallel that oscillation does not occur between them. A 5° angle between the sides 20,22 typically is sufficient. The ends 24,26 of the crystal 12 which lie along the axis perpendicular to the mirrors 18,36 preferably are flat and parallel to each other and the mirrors 18,36.

The concentration of $Ce^{3+}$ in the crystal 12 preferably will be selected to reflect the trade off between optimal crystal quality and optimal laser power density. Higher concentrations of $Ce^{3+}$ dopant will generally lead to larger power densities, and desirably higher power outputs. However, $Ce^{3+}$ is a large ion which does not fit especially well in the LiSAF host at high concentrations. If the dopant concentration is too high, excessive crystalline defects will result.

Typically, the $Ce^{3+}$ dopant concentration will be between about 0.4 at % and about 1.4 at %. Preferably, the $Ce^{3+}$ dopant concentration will be between about 0.6 at % and about 1.2 at %. More preferably, the $Ce^{3+}$ dopant concentration will be between about 0.8 at % and about 1.0 at %.

In a side-pumping configuration, a longer crystal will permit the use of a lower input power density (i.e., fluence) to achieve a given total input power. Accordingly, it is preferred to use the longest crystal length that can be made with high quality and reasonable cost and is sufficient to achieve the power output required for the desired application. Typically, crystals having lengths between about 3 mm and about 12 mm will be used. More typically, crystals having lengths between about 5 mm and about 7 mm will be used.

Frequency doubling, if desired, typically is achieved using a frequency doubling crystal 34. Most preferably, this crystal 34 is disposed intracavity, as shown in FIG. 1, to take advantage of the high intracavity intensities. Alternatively, the doubling crystal is disposed outside the laser cavity or within a separate cavity. Preferred materials for doubling crystals include potassium titanyl phosphate (KTP), yttrium aluminum borate (YAB), lithium borate ($LiB_3O_5$), potassium niobate ($KNbO_3$), and lithium niobate ($LiNbO_3$).

If tuning is desired, a tuning element 28 is inserted in the cavity at Brewster's angle, between the laser crystal 12 and the output mirror 36. This tuning element may be a birefringent tuning plate, a grating, or a prism. The coatings 38,40 of the laser crystal 12 have sufficient bandwidth to allow tuning over the desired wavelength range.

Figure 4:
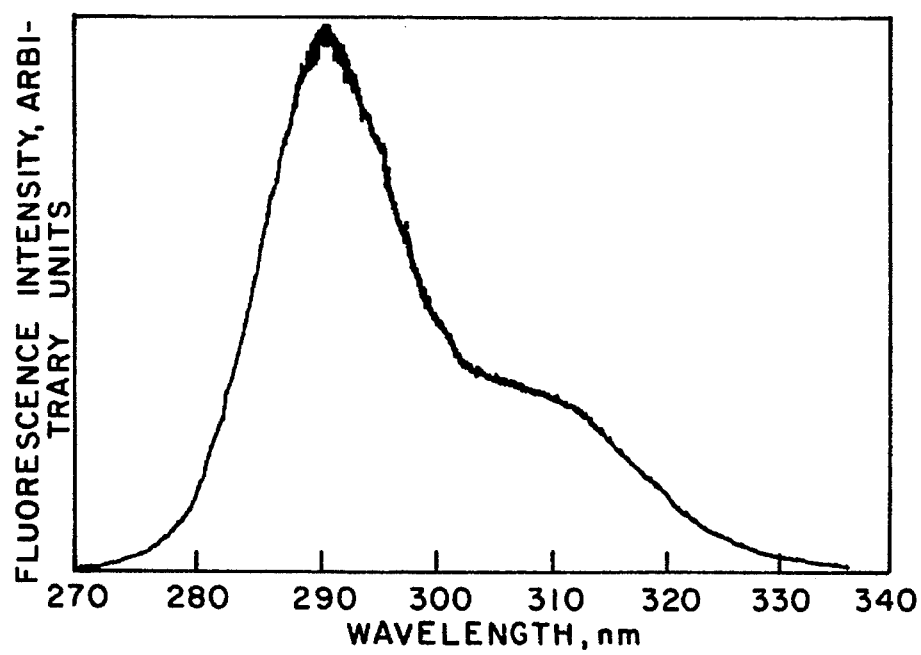
FIG. 4 shows the Ce:LiSAF room temperature emission spectrum (π polarized).

Continuous tuning of the laser is achieved over the desired wavelength range by using a motor 32 which is operationally coupled to the tuning element 28, to rotate the tuning element about its axis 30 in either of the directions indicated by the arc. Tunability is governed by fluorescence, which is shown for Ce:LiSAF in FIG. 4.

Typically, the mirrors 18,36 that define the cavity will be discrete mirrors some finite distance from the ends 24,26 of the crystal 12. Alternatively, one or both of the mirrors may be a reflective coating applied to the crystal. For example, the output mirror 36 may be a freestanding mirror, while the opposing mirror 18 may be a coating applied to the crystal 12.

Having described the invention, the following examples are given to illustrate specific applications of the invention, including the best mode now known to perform the invention. These specific examples are not intended to limit the scope of the invention described in this application.

EXAMPLE 1

The apparatus shown in FIG. 1 was assembled. The Ce:LiSAF laser resonator included a 3 m radius of curvature high reflector and a flat output coupler separated by 20 cm. The Ce:LiSAF crystal (4 mm×4 mm×6 mm) was located midway between the two cavity end mirrors, and was oriented with its c-axis perpendicular to the resonator axis. Output couplers of 26% transmission and 70% transmission were used. To prevent laser oscillation between the two uncoated ends of the crystal, one end face was fabricated with a 5° wedge.

The pump source was a frequency-quadrupled 10 Hz Q-switched Nd:YAG laser operating at 266 nm. The pump beam polarization was aligned parallel to the c-axis of the crystal. Focussing of the pump beam with a 15 cm focal length cylindrical lens produced a 1 mm×6 mm beam area on the laser crystal.

Figure 5:
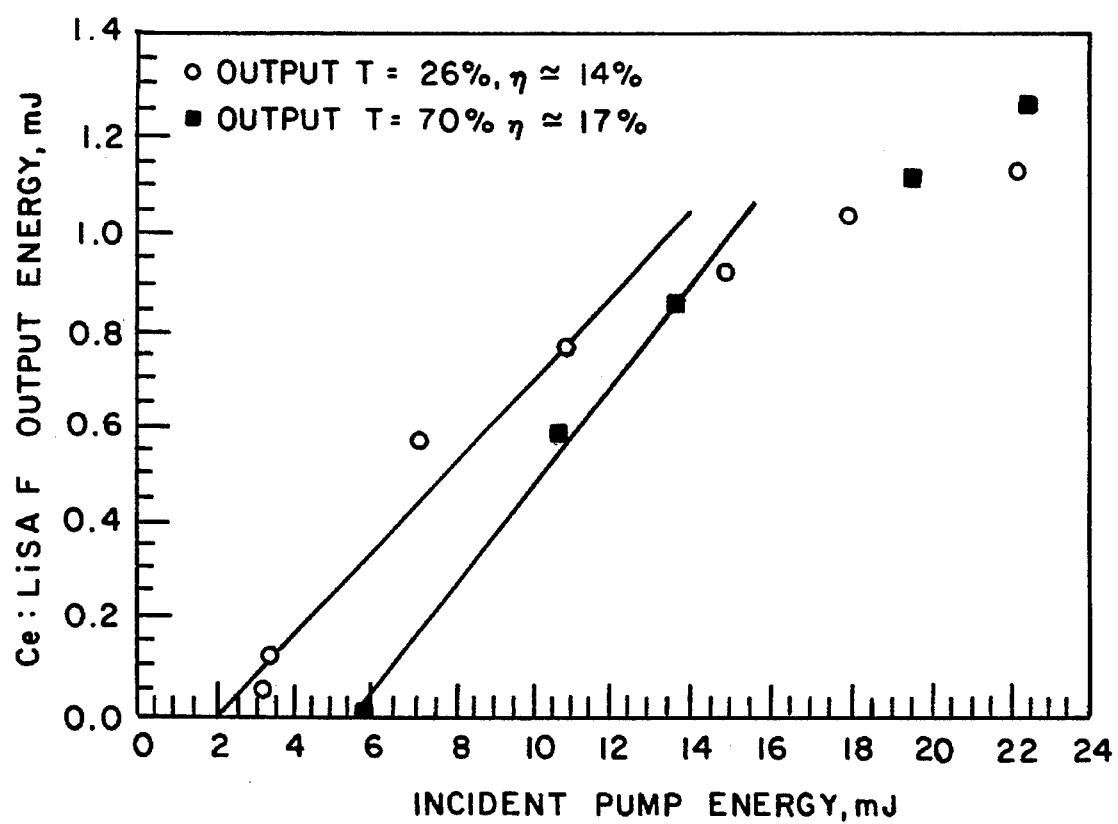
FIG. 5 shows the Ce:LiSAF laser output energy as a function of incident pump energy.

Free-running operation of the laser was observed at 290 nm, corresponding to the peak of the 4d–4f fluorescence spectrum. Laser emission was completely polarized along the c-axis of the crystal ($\pi$-polarized). FIG. 5 shows the output energy as a function of absorbed input pump energy. As shown, using an output coupler with 26% transmission, the slope efficiency $\eta$ was 14%. Using an output coupler with 70% transmission, $\eta$ increased to 17%. For an incident pump energy of 22 mJ, a maximum output energy of 1.3 mJ was delivered by the laser in a 6 ns pulse.

At incident pump energy fluences greater than 100 $mJ/cm^2$, the laser saturated. This effect is most likely due to absorption saturation of the pump beam in the focussed region of the crystal.

EXAMPLE 2

Example 1 was repeated, except that the laser was tuned over a range of output wavelengths. Tuning was accomplished by an intracavity Brewster-angle Supracil prism located near the output coupler, or a Littrow-oriented diffraction grating (2400 grooves/mm). Tuning out to 315 nm was achieved. This tuning range of 285 nm to 315 nm showed that this laser is suitable for use as a seed source for XeCl at 308 nm, and suggested the ability to tune out to 320 nm. The size of this tuning range is about double that of the tuning range for the Ce:LiSAF laser.

Obviously, many modifications and variations of the present invention are possible in light of the above teachings. It is therefore to be understood that, within the scope of the appended claims, the invention may be practiced otherwise than as specifically described.

What is claimed is:

1. An ultraviolet solid state laser, comprising:
   a laser cavity defined by a first mirror and an opposing second mirror;
   a laser medium disposed in said laser cavity, consisting essentially of a LiSAF host material doped with an amount of cerium ions sufficient to produce a longitudinal mode laser emission when said laser medium is pumped by pumping means; and
   means for pumping said laser medium.

2. The solid state laser of claim 1, wherein said laser medium comprises between about 0.005 at % and about 2.0 at % $Ce^{3+}$.

3. The solid state laser of claim 1, wherein said laser medium comprises between about 0.05 at % and about 1.0 at % $Ce^{3+}$.

4. The solid state laser of claim 1, wherein said means for pumping said laser medium comprises means for pumping said laser medium at a wavelength between about 260 nm and about 275 nm.

5. The solid state laser of claim 4, wherein said means for pumping said laser medium comprises a neodymium solid state laser operating in the fourth harmonic of neodymium.

6. The solid state laser of claim 5, wherein said pumping neodymium solid state laser comprises $Nd^{3+}$ ions doped into a host selected from YAG, YAlO, YLF, and mixtures thereof.

7. The solid state laser of claim 1, further comprising means for doubling the frequency of said laser emission.

8. The solid state laser of claim 7, wherein said frequency doubling means are disposed within said laser cavity.

9. The solid state laser of claim 8, wherein said frequency doubling means comprise a crystal further comprising a material selected from the group consisting of KTP, YAB, $LiB_3O_5$, $KNbO_3$, and $LiNbO_3$.

10. A tunable ultraviolet solid state laser, comprising:

a laser cavity defined by a first mirror and an opposing second mirror;

a laser medium disposed in said laser cavity, consisting essentially of a LISAF host material doped with an amount of cerium ions sufficient to produce a longitudinal mode laser emission when said laser medium is pumped by pumping means;

means for pumping said laser medium; and means for tuning said laser emission to one of a plurality of wavelengths within a first wavelength tuning range, said tuning means disposed within said laser cavity.

11. The solid state laser of claim 10, wherein said first wavelength tuning range comprises wavelengths between about 285 nm and about 320 nm.

12. The solid state laser of claim 11, further comprising means for doubling the frequency of said laser emission, wherein said tuning means comprise means for tuning said frequency-doubled laser emission to one of a plurality of wavelengths in a second wavelength tuning range, wherein each of said wavelengths in said second wavelength tuning range are one half of a wavelength within said first wavelength tuning range.

13. The solid state laser of claim 10, wherein said tuning means comprises:

a tuning element; and means for rotating said tuning element about its axis to tune the laser emission to a wavelength within said first wavelength tuning range.

14. The solid state laser of claim 13, wherein said tuning element comprises a grating.

15. The solid state laser of claim 13, wherein said tuning element comprises a Brewster cut prism.

16. The solid state laser of claim 13, wherein said tuning element comprises a birefringent tuning plate.

17. An ultraviolet solid state transverse pumped laser, comprising:

a laser cavity defined by a first mirror and an opposing second mirror;

a laser medium disposed in said laser cavity, consisting essentially of a LISAF host material doped with an amount of cerium ions sufficient to produce a longitudinal mode laser emission when said laser medium is pumped by pumping means; and means for transverse pumping said laser medium.

18. The solid state transverse pumped laser of claim 17, wherein said side pumping means comprises means for directing pump radiation onto said host material at an angle that is essentially perpendicular to an axis defined by said first mirror and said second opposing mirror.

19. The solid state transverse pumped laser of claim 18, wherein said means for directing pump radiation onto said host material at an angle that is essentially perpendicular to an axis defined by said first mirror and said second opposing mirror further comprises a cylindrical lens for directing pump radiation onto said host material.

20. The solid state transverse pumped laser of claim 19, wherein said cylindrical lens for directing pump radiation onto said host material is adapted for directing said pump radiation onto an essentially flat sideface of said host material, and wherein said sideface of said host material is opposed by an opposing essentially flat sideface of said host material, wherein said sideface and said opposing sideface form an angle therebetween that is sufficiently large to prevent laser oscillation between said sideface and said opposing sideface.

21. The solid state transverse pumped laser of claim 20, wherein said angle formed between said sideface and said opposing sideface is at least about 5°.

\* \* \* \* \*